(12) United States Patent
Chang et al.

(10) Patent No.: US 10,574,368 B2
(45) Date of Patent: Feb. 25, 2020

(54) DEVICES AND METHODS FOR DETERMINING CHANNEL QUALITY INDICATOR FOR HIGHER RESOURCE ALLOCATION

(71) Applicant: Intel Corporation, Santa Clara, CA (US)

(72) Inventors: Gary Chang, Santa Clara, CA (US); Ismael Gutierrez, San Jose, CA (US); Sriram Sridharan, San Diego, CA (US); Ziyang Ju, Munich (DE)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 16/022,745

(22) Filed: Jun. 29, 2018

(65) Prior Publication Data
US 2020/0007246 A1 Jan. 2, 2020

(51) Int. Cl.
| | |
|---|---|
| *H04B 17/309* | (2015.01) |
| *H04L 5/00* | (2006.01) |
| *H04B 17/382* | (2015.01) |
| *H04W 72/08* | (2009.01) |
| *H04W 72/04* | (2009.01) |

(52) U.S. Cl.
CPC ......... *H04B 17/309* (2015.01); *H04B 17/382* (2015.01); *H04L 5/0057* (2013.01); *H04W 72/0413* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 8,731,038 | B2 | 5/2014 | Pean et al. | |
| 2010/0311430 | A1* | 12/2010 | Katayama | H04L 1/0027 455/450 |
| 2013/0324050 | A1* | 12/2013 | Gutierrez | H04W 24/10 455/67.11 |
| 2013/0329691 | A1* | 12/2013 | Kim | H04L 5/001 370/329 |

(Continued)

OTHER PUBLICATIONS

Stefania Sesia et al, "LTE—The UMTS Long Term Evolution: From Theory to Practice", 2011, pp. 279-291, 2nd Edition, Wiley.

(Continued)

*Primary Examiner* — Mohammad S Adhami
(74) *Attorney, Agent, or Firm* — Viering, Jentschura & Partner MBB

(57) ABSTRACT

Devices and methods for determining a wideband Channel Quality Indicator (wbCQI) and a plurality of sub-band Channel Quality Indicators (CQIs) for reporting to a network, including deriving a first metric for a wideband and each of a plurality of sub-bands from a received signal; converting the wideband first metric and the plurality of sub-band first metrics to a wideband CQI and a plurality of sub-band CQIs; determining a skewness of the plurality of sub-band CQIs to the wideband CQI by comparing each of the plurality of sub-band CQIs to the wideband CQI; modifying the wideband CQI when a negative skewness is determined and recomputing the plurality of sub-band CQIs based on the modified wideband CQI; and providing the modified wideband CQI and the plurality of recomputed sub-band CQIs to the network.

20 Claims, 14 Drawing Sheets

(56) References Cited

U.S. PATENT DOCUMENTS

2015/0043477 A1* 2/2015 Nagata ................ H04B 7/024
370/329
2018/0317249 A1* 11/2018 Caretti ............. H04W 72/1247

OTHER PUBLICATIONS

3GPP, "Technical Specification Group Radio Access Network; NR; Physical layer procedures for data", 3rd Generation Partnership Project (GPP), TS 38.214, Jun. 2018, pp. 32-65, V15.2.0.

Rajendra K. Jain et al, "A Quantitative Measure of Fairness and Discrimination for Resource Allocation in Shared Computer Systems", Digital Equipment Corporation: DEC-TR-301, Sep. 1984, 38 pages.

3GPP, "Technical Specification Group Radio Access Network; Evolved Universal Terrestrial Radio Access (E-UTRA); User Equipment (UE) radio transmission and reception", 3rd Generation Partnership Project (GPP), TS 36.101, Mar. 2018, pp. 1047-1050, V15.2.0.

* cited by examiner

DEVICES AND METHODS FOR DETERMINING CHANNEL QUALITY INDICATOR FOR HIGHER RESOURCE ALLOCATION

TECHNICAL FIELD

Various embodiments relate generally to wireless communications.

BACKGROUND

Network access nodes, e.g. base stations in Long-Term Evolution (LTE) networks and beyond, are responsible for resource scheduling in both the uplink and downlink channels for a plurality of users in their respective network coverage areas. During resource scheduling for each of the plurality of users, the network access nodes may take a variety of considerations into account, including Quality of Service (QoS) requirements. Since both the time and frequency resources of a single network access node are finite, User Equipment (UE) which report improved Channel State Information (CSI) conditions to the network access node increase the likelihood of being prioritized in network resource allocation.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
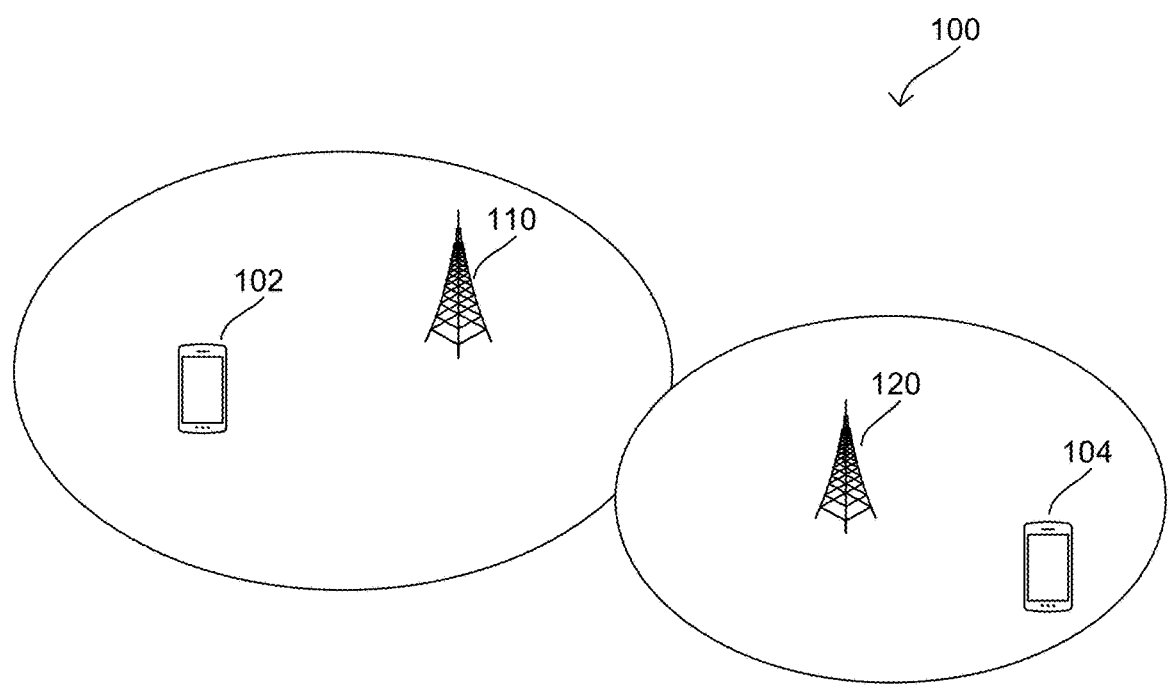
FIG. 1 shows an exemplary radio communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies)., and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
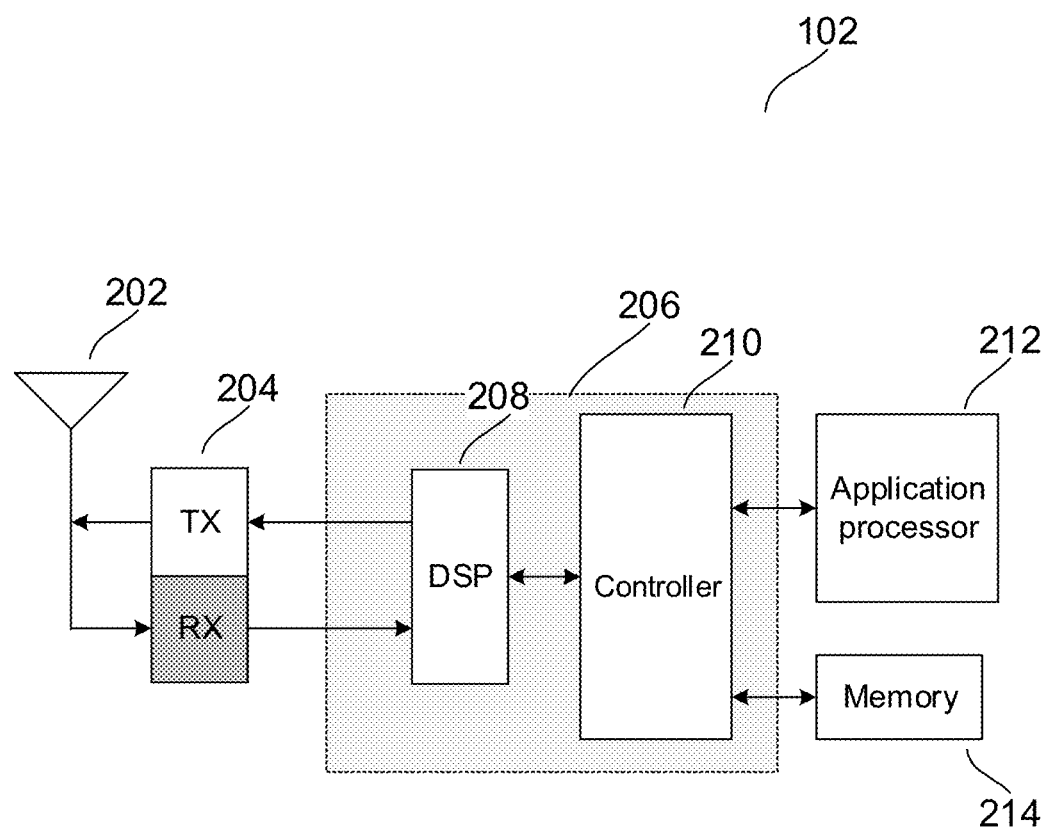
FIG. 2 shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancellation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FI, in some aspects antenna system 202, RF transceiver 204, digital signal processor 208, and/or protocol controller 210 can encompass separate components dedicated to different radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Figure 3:
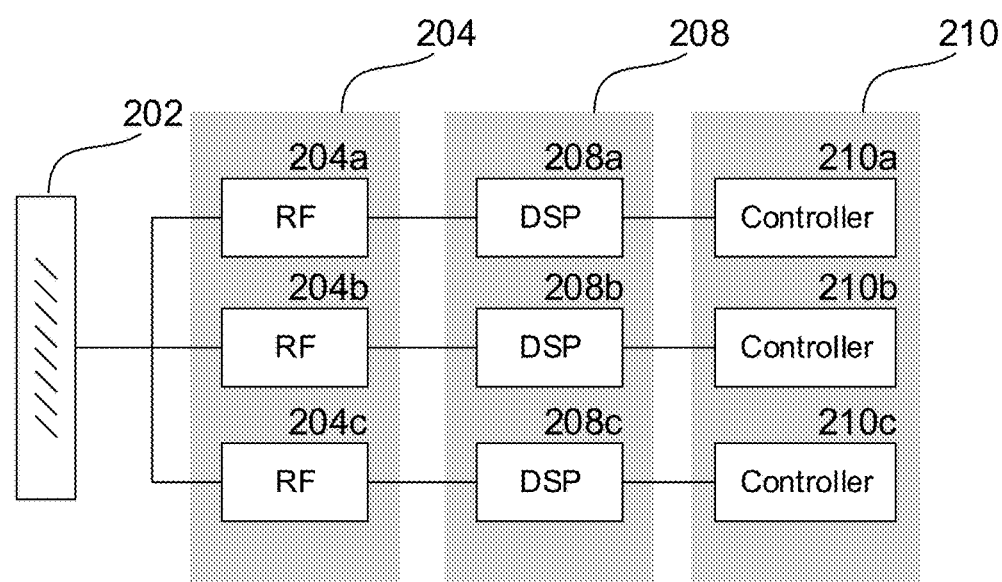
FIG. 3 shows an exemplary configuration of signal acquisition and processing circuitry according to some aspects.

FIG. 3 shows an example in which RF transceiver 204 includes RF transceiver 204a for a first radio communication technology, RF transceiver 204b for a second radio communication technology, and RF transceiver 204c for a third radio communication technology. Likewise, digital signal processor 208 includes digital signal processor 208a for the first radio communication technology, digital signal processor 208b for the second radio communication technology, and digital signal processor 208c for the third radio communication technology. Similarly, controller 210 may include controller 210a for the first radio communication technology, controller 210b for the second radio communication technology, and controller 210c for the third radio communication technology. RF transceiver 204a, digital signal processor 208a, and controller 210a thus form a communication arrangement (e.g., the hardware and software components dedicated to a particular radio communication technology) for the first radio communication technology, RF transceiver 204b, digital signal processor 208b, and controller 210b thus form a communication arrangement for the second radio communication technology, and RF transceiver 204c, digital signal processor 208c, and controller 210c thus form a communication arrangement for the third radio communication technology. While depicted as being logically separate in FIG. 4, any components of the communication arrangements may be integrated into a common component.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 4:
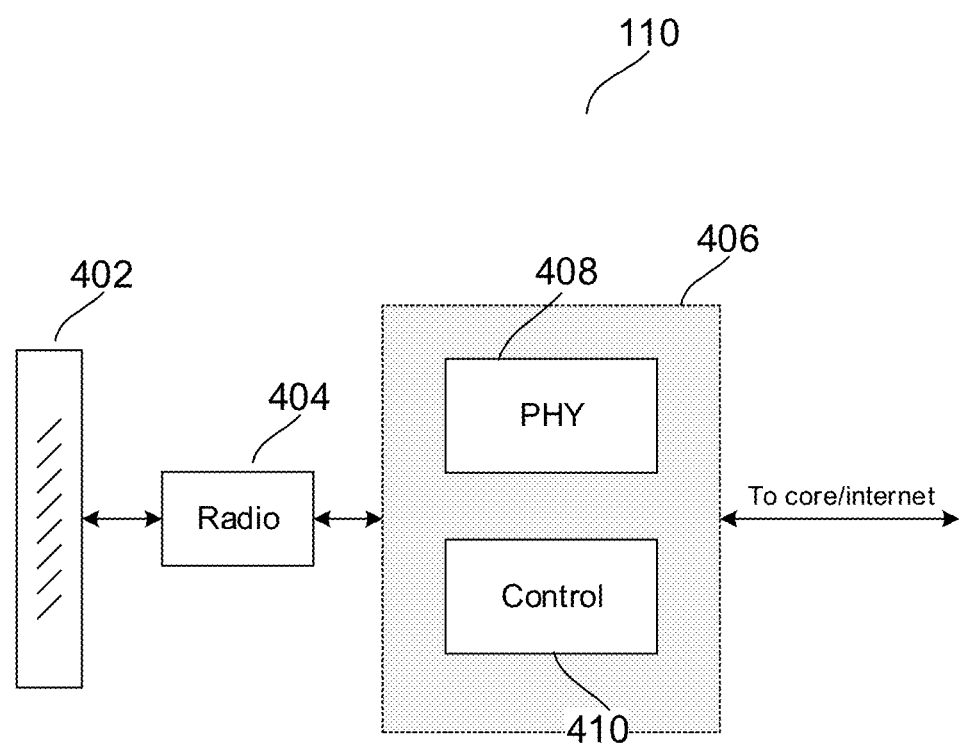
FIG. 4 shows an exemplary internal configuration of a network access node in some aspects.

FIG. 4 shows an exemplary internal configuration of a network access node, such as network access node 110, according to some aspects. As shown in FIG. 4, network access node 110 may include antenna system 402, radio transceiver 404, and baseband subsystem 406 (including physical layer processor 408 and protocol controller 410). In an abridged overview of the operation of network access node 110, network access node 110 may transmit and receive wireless signals via antenna system 402, which may be an antenna array including multiple antennas. Radio transceiver 404 may perform transmit and receive RF processing to convert outgoing baseband samples from baseband subsystem 406 into analog radio signals to provide to antenna system 402 for radio transmission and to convert incoming analog radio signals received from antenna system 402 into baseband samples to provide to baseband subsystem 406. Physical layer processor 408 may be configured to perform transmit and receive PHY processing on baseband samples received from radio transceiver 404 to provide to controller 410 and on baseband samples received from controller 410 to provide to radio transceiver 404. Controller 410 may control the communication functionality of network access node 110 according to the corresponding radio communication technology protocols, which may include exercising control over antenna system 402, radio transceiver 404, and physical layer processor 408. Each of radio transceiver 404, physical layer processor 408, and controller 410 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 404 may be a radio transceiver including digital and analog radio frequency processing and amplification circuitry. In some aspects, radio transceiver 404 may be a software-defined radio (SDR) component implemented as a processor configured to execute software-defined instructions that specify radio frequency processing routines. In some aspects, physical layer processor 408 may include a processor and one or more hardware accelerators, wherein the processor is configured to control physical layer processing and offload certain processing tasks to the one or more hardware accelerators. In some aspects, controller 410 may be a controller configured to execute software-defined instructions that specify upper-layer control functions. In some aspects, controller 310 may be limited to radio communication protocol stack layer functions, while in other aspects controller 410 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 5:
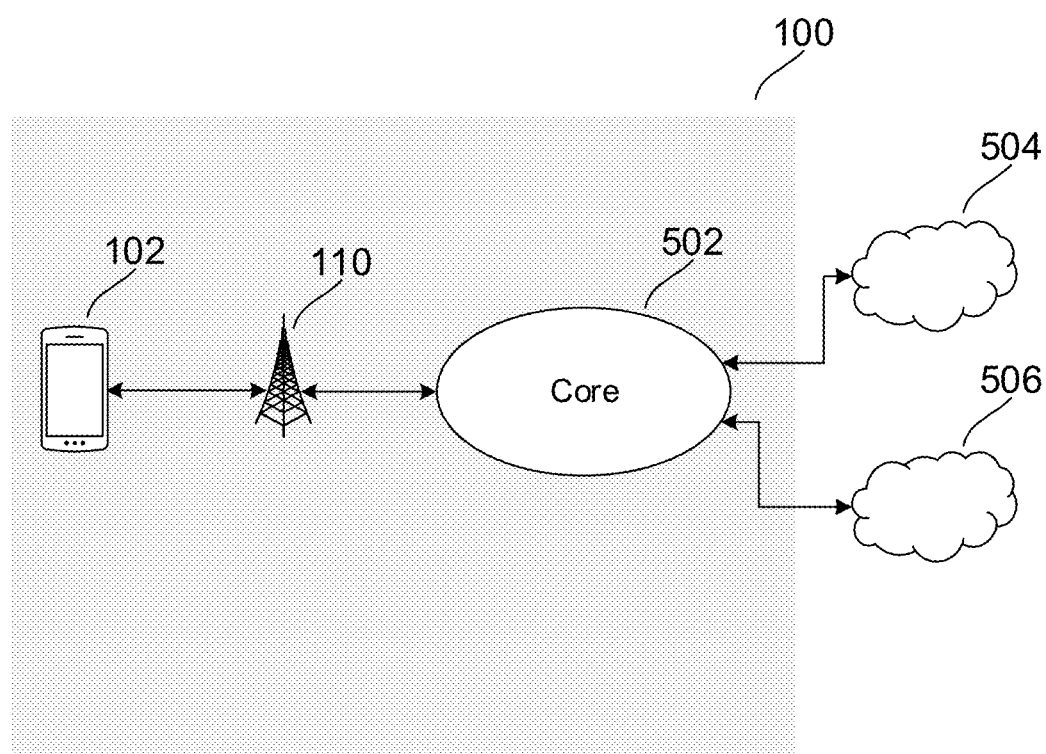
FIG. 5 shows an exemplary configuration of a network access node interfacing with core network according to some aspects.

As previously indicated, network access nodes 110 and 120 may interface with a core network. FIG. 5 shows an exemplary configuration in accordance with some aspects where network access node 110 interfaces with core network 502, which may be, for example, a cellular core network. Core network 502 may provide a variety of functions to manage operation of radio communication network 100, such as data routing, authenticating and managing users/subscribers, interfacing with external networks, and various other network control tasks. Core network 502 may therefore provide an infrastructure to route data between terminal device 104 and various external networks such as data network 504 and data network 506. Terminal device 102 may thus rely on the radio access network provided by network access node 110 to wirelessly transmit and receive data with network access node 110, which may then provide the data to core network 502 for further routing to external locations such as data networks 504 and 506 (which may be packet data networks (PDNs)). Terminal device 102 may therefore establish a data connection with data network 504 and/or data network 506 that relies on network access node 110 and core network 502 for data transfer and routing.

In $4^{th}$ Generation (4G) and $5^{th}$ Generation (5G) systems, network access node 110 (i.e. base station, e.g. eNB for 4G, gNB for 5G and beyond) is responsible for resource scheduling for both the uplink and downlink channels. Network access node 110 must further fulfill the expectations of as many users as possible within its coverage area while taking into consideration Quality of Service (QoS) requirements. A single-cell LTE or New Radio (NR) system includes a K number of UEs competing for a fixed amount of resources, in both time and frequency, made available from the network access node 110.

Figure 6:
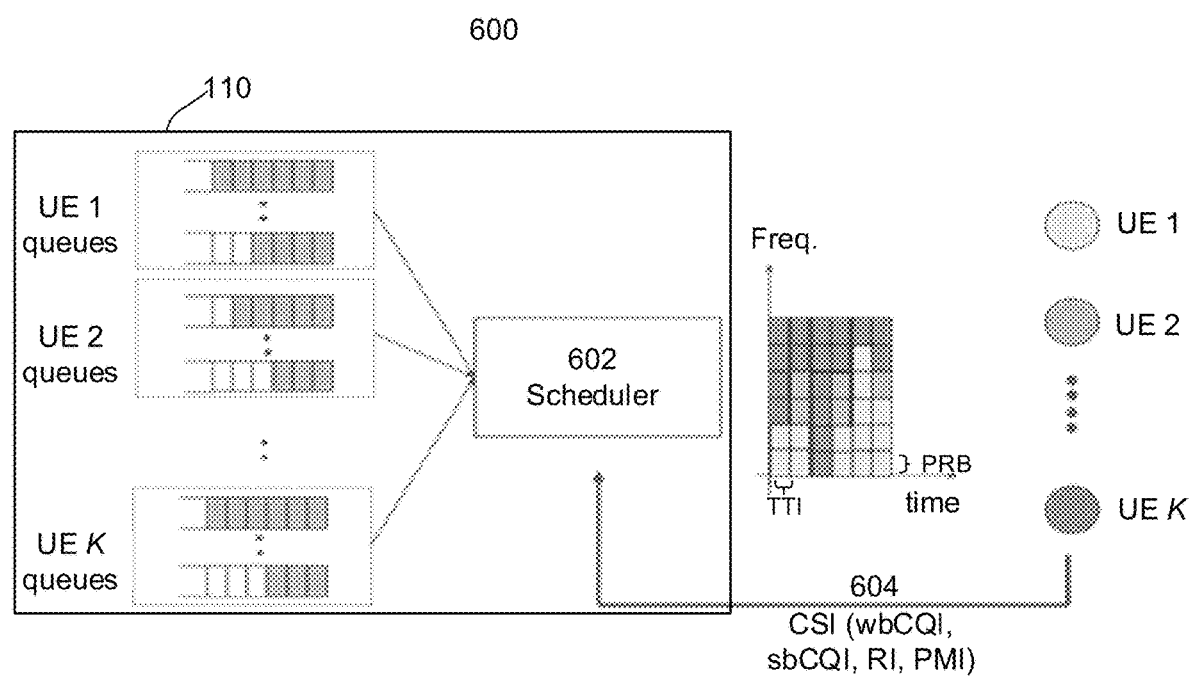
FIG. 6 shows a scheduling arrangement for a network access node according to some aspects.

FIG. 6 shows a scheduling arrangement 600 for a network access node in an OFDM based wireless network. It is appreciated that scheduling arrangement 600 is exemplary in nature and may therefore be simplified for purposes of this explanation.

Each network access node, e.g. network access nodes 110 and 120, has a fixed total bandwidth, B, with a limited number of M Physical Resource Blocks (PRBs). A PRB is the lowest granularity of a frequency resource that the network access node can allocate at a particular instance of time, and it can be allocated to a subset of K UEs. The lowest time granularity which the network access node can alter is a Transmission Time Interval (TTI), which is set to 1 ms in LTE, and in NR, the length of TTI is scalable with the subcarrier spacing and is capable of offering lower latency than LTE.

In the downlink (DL) direction, the network access node schedules its limited time-frequency resources based on two types of information: 1) traffic volume and its associated priority, and 2) Channel State Information (CSI). To address traffic volume and its associated priority, the network access node maintains one or more queues for each UE to store data traffic and for serving each of competing UE, e.g. UE 1, UE 2, . . . , UE K.

Each queue may have its own QoS requirements maintained by the network access node. For example, voice traffic typically has latency constraints and therefore needs to be assigned a higher priority by the network access node than other forms of traffic, e.g. web-browsing.

The CSI is tightly coupled with the adaptive modulation and coding scheme (MCS), e.g. QPSK, 16QAM, 64QAM, etc. Network access node supports a plurality of link adaptation methods, where the MCS is adapted to the current observe link conditions as observed by the UE in order to meet a targeted block error rate (BLER). The UE provides a limited set of feedbacks such as CSI and acknowledgement/negative-acknowledgement (ACK/NACK) response on its received DL resources. The CSI reflects the achievable spectral efficiency by the UE while the ACK/NACK response can be used to estimate channel and interference conditions not captured by the CSI. A set of predefined CSI is specified in the 3GPP specification TS 38.214 including Wide-Band Channel Quality Indicator (wbCQI), Sub-Band Channel Quality Indicator (sbCQI), Rank Indication (RI), and the Precoding Matrix Indicator (PMI). In the UE's feedback message 604 to the network access node, the wbCQI index is limited to a discrete value from 0 to 15, and the sbCQI reported to the network is limited to 2-bits, where the sbCQI for each sub-band is encoded differently with respect to their respective wbCQI.

For purposes of the ensuing explanation, sbCQI is the sbCQI reported to the network and sbCQI_i is the sbCQI that the UE maintains internally for computation. Also, Q(x) denotes the mapping from offset level to sbCQI based on Table 1 below (Table 1 reproduced from 3GPP TS 38.214), where the offset level=sbCQI_i−wbCQI. The reported sbCQI for each sub-band can then be computed as sbCQI=Q (sbCQI_i−wbCQI).

TABLE 1

| Sub-band differential CQI value | Offset level |
| --- | --- |
| 0 | 0 |
| 1 | 1 |
| 2 | ≥2 |
| 3 | ≤−1 |

To assist the network access node in achieving the targeted BLER, the UE sends a proposal for the MCS choice in the form of wbCQI and sbCQI. In one approach, the UE computes modulation-specific mutual information (MI) for use as the underlying metric for determining the CSI. The MI is an estimate on the hypothetical spectral efficiency for the active carrier bandwidth B and for each sub-band of B. The MI for both wideband and sub-band can be mapped and quantized to compute the RI, PMI, wbCQI, and sbCQI. Then, the CQI which achieves the given target BLER is selected.

Figure 7:
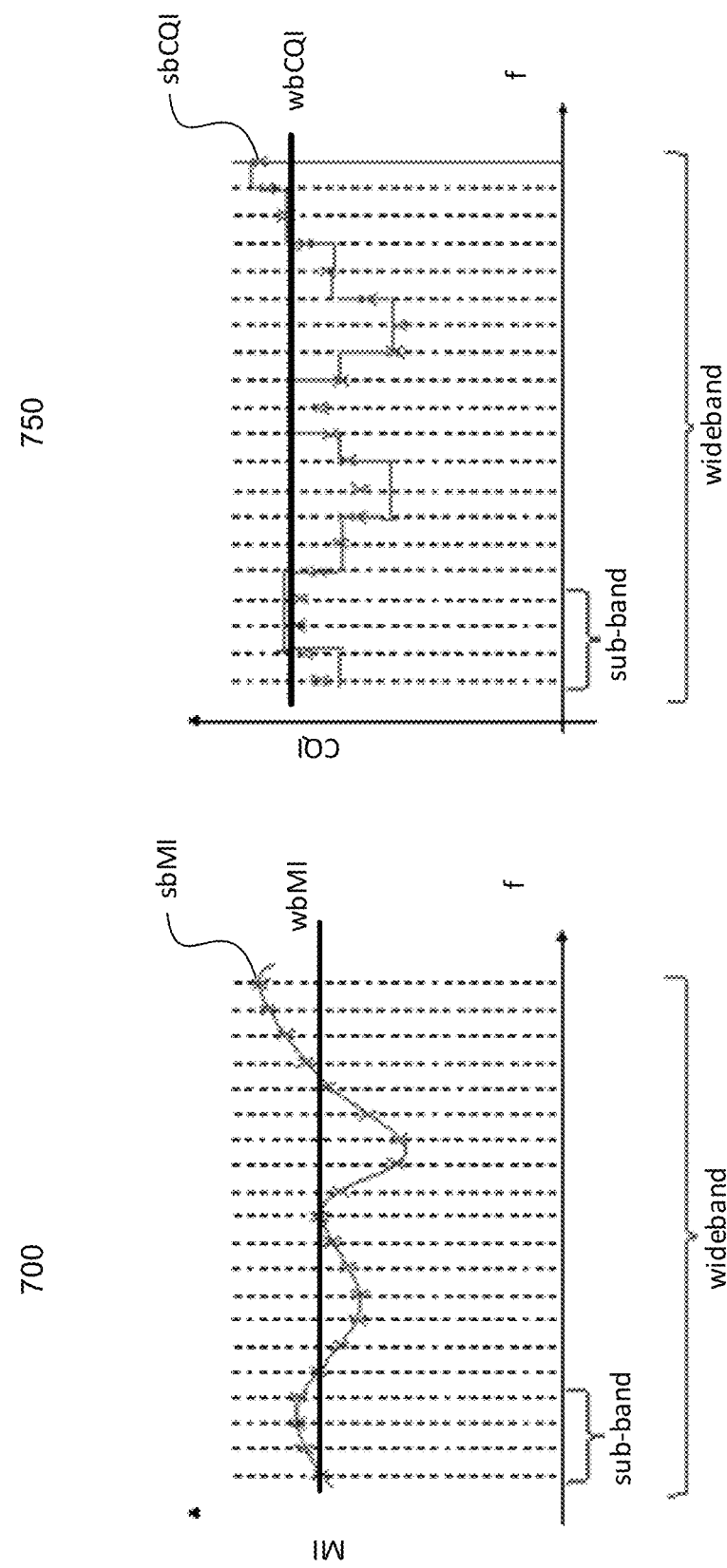
FIG. 7 shows exemplary diagrams for the Mutual Information (MI) and the Channel Quality Indicator (CQI) mapping for each sub-band across the wideband according to some aspects.

FIG. 7 shows exemplary diagrams for the Mutual Information (MI) 700 and the Channel Quality Indicator (CQI) 750 for each sub-band across the wideband according to some aspects. It is appreciated that diagrams 700 and 750 are exemplary in nature, and may therefore be simplified for purposes of this explanation.

On diagram 700, the Mutual Information (MI) is plotted for each the sub-bands across the whole wideband, and the MI for the entire wideband, wbMI, is also shown. Each sub-band MI (sbMI) is denoted by a marking along the curve (the rightmost sbMI on the MI plot is indicated).

On diagram 750, the MI gets mapped into discrete values of CQI for each sub-band via a non-linear transformation to achieve a BLER target, e.g. 10% BLER. It is appreciated that only the rightmost sbCQI is indicated on the CQI plot of diagram 750.

In this example, there are more points with a sbCQI value less than the respective wbCQI than there are sbCQI values higher than the wbCQI. Since the sbCQI has a 2-bit resolution on the differential to the wbCQI, all sub-bands with lower values than the wbCQI (i.e. offset level≤−1) will be reported as 3, while only two sub-bands that have an offset level=1 will be reported with positive offsets. It is important to note that the CQI, for both the wideband and the sub-bands, is merely a proposal from the UE to the network access node of the choice for the MCS. The network access node may further refine the MCS selection via the UE's ACK/NACK response or other internal metrics to achieve the target BLER rate.

In addition to BLER control, the CQI may also be utilized by the network access node in downlink resource allocation. In general, there are two classes of scheduling: opportunistic scheduling and fair scheduling. An opportunistic scheduler is designed to maximize the aggregate throughput of all UEs by exploiting that fact that each UE may experience a different channel at a different point in time and frequency. At a given point in time, a resource block (RB) is given to a specific UE among K competing UEs, which then reports the best channel condition in the corresponding sub-band for that RB. This approach allows the network access node to maximize its throughput at the expense of UEs with poor channel conditions, i.e. starving UEs. On the other hand, a fair scheduler attempts to distribute resources in a more equal manner as defined by some fairness indicator, where a certain minimum rate may be guaranteed for each UE. In practice, a commercial network access node may employ a combination of these two approaches in a scheduler 602 to achieve its intended QoS requirements.

In some aspects, the disclosure herein provides an approach for communication devices in LTE and NR systems to adjust both wbCQI and sbCQI to gain additional time and frequency resources during resource competition between a plurality of UEs by refining the CQI to utilize characteristics in opportunistic scheduling to gain advantages in resource allocation.

Figure 8:
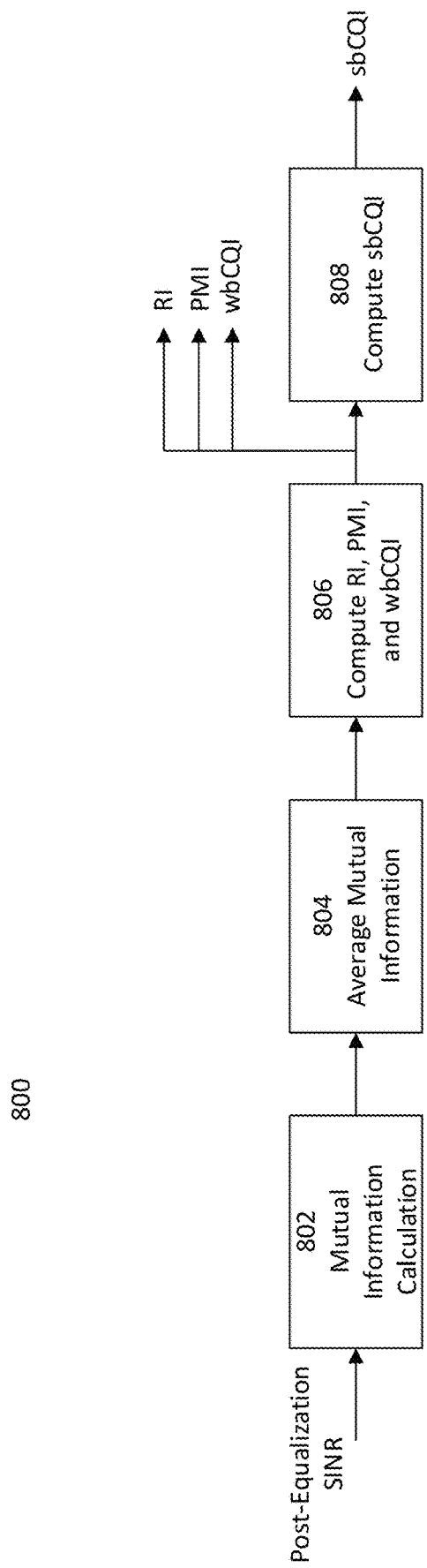
FIG. 8 shows a feedback estimator CSI computation model according to some aspects.

FIG. 8 shows a feedback estimator CSI computation model 800 in some aspects. It is appreciated that CSI computation model 800 is exemplary in nature and may therefore be simplified for purposes of this explanation.

In general, a feedback estimator takes a post-equalization signal to noise interference ratio (SINR) to compute the mutual information 802, which is then used to compute the average mutual information (MI) 804. The average mutual information is computed for each sub-band as well as across the entire bandwidth of the wideband. From the average mutual information, a non-linear mapping converts the average MI to Rank Indication (RI), Precoding Matrix Indicator (PMI), and the wideband Channel Quality Indicator (wbCQI) 806. Afterwards, the sbCQI is computed 808 based on the sub-band MI. The non-linear mapping is used to map the MI to a CQI that achieves a target BLER, e.g. 10%.

In some aspects, the methods and devices provide a determination of the CSI in OFDM communications, including estimating a frequency selective interference noise covariance matrix for each PRB, obtaining a normalized channel matrix by weighing the channel matrix from the interference estimate, and determining a channel equivalent matrix by multiplying the available precoding matrices with the normalized channel matrix.

The post-equalization SINR may be calculated depending on the type of equalizer employed by the baseband modem 206. From the post-equalization SINR, the mutual information (MI) may be derived 802 as a function of the modulation scheme. Specifically, the MI may be calculated in 802 by computing a hypothetical capacity for all input post-equalization SINR and applying a non-linear transform to the hypothetical capacity. The non-linear transform may model the actual modulation scheme and the receiver-specific MCS demapper to obtain the MI for the post-equalization SINR values.

The post-equalization SINR (input to 802) is computed as a function of the equalizer used in data demodulation of the baseband modem 206. For example, in the case that a maximum ratio combining equalizer is used, the post-equalization SINR may be obtained by determining a squared Frobenius norm of the channel matrix. In another example, in the case that a MIMO minimum mean square error equalizer is used, the post-equalization SINR may be obtained by computing the channel covariance matric and deriving the SINR for each code word. In another example, in the case that a MIMO maximum likelihood detection equalizer is used, the post-equalization SINR may be derived from the eigenvalues for the modified channel covariance matrix.

Prior to the post-equalization SINR being fed to the mutual information calculator 802, the baseband modem 206 may remove guard intervals of the received OFDM signal and process it via FFT to convert the received time domain symbols into the frequency domain. The channel estimation and the noise level estimation are typically performed based on the reference symbols in the frequency domain and may be further subject to normalization prior to feedback estimation. The feedback estimation, including the determination of the CSI parameters (e.g. RI, PMI, wbCQI, sbCQI), is performed based on the channel estimation and/or noise level estimation, e.g. the post-equalization SINR.

CSI computation model 800 implements the CSI estimation for feedback (used for reporting the CSI as shown by 604 in FIG. 6) with a number of hardware and/or software blocks, including a de-coding block and post-equalization SINR block (not pictured) for feeding the post-equalization SINR to the mutual information calculation block 802.

The de-coding block may be configured to receive a normalized channel estimation matrix, obtained from a channel estimation output normalized with a noise level estimation output. The frequency selective noise covariance matrix is estimated on a PRB basis, and the resulting normalized channel matrix is fed to the de-coding block, where the normalized channel estimate matrix may be multiplied by all available precoding matrices to produce a channel equivalent matrix.

This is followed by the post-equalization SINR calculation, which is performed according to the equalizer in use in the baseband modem 206 (e.g. a maximum ratio combining equalizer, a MIMO minimum mean square error equalizer, a MIMO maximum likelihood detection equalizer, etc.).

Once the post-equalization SINR is determined, it is fed to the mutual information (MI) calculation unit 802. The MI is derived for each post-equalization SINR value (i.e. for each code word and sub-band); therefore, the MI determination is made for the MCS type of each code word. The MI calculation 802 may be determined as follows.

First, the hypothetical capacity is computed for each post-equalization SINR code word value with a capacity calculator (included in Mutual Information Calculation 802). The hypothetical capacity is calculated with parameters that model the parameter estimation error variance caused by the channel estimation error and a parameter accounting for downlink power allocation compensation, thereby coping with time varying downlink power allocation in OFDM communication networks (e.g. LTE). An exemplary formula for the calculation of the capacity, $c_k^l$, for each post-equalization SINR value, $SINR_k^l$, may be given by:

$$c_k^l = \log2\left(\frac{\epsilon}{\delta} + SINR_k^l\right) + \log2(\delta) \quad (1)$$

where l is the code word, k is the sub-band, E is the parameter estimation error variance caused by the channel estimation error and δ is a DL power allocation compensation term to cope with the time varying Dl power allocation in OFDM networks (e.g. LTE or NR).

A non-linear transform is applied to model the modulation type and the receiver specific demapper configuration in order to calculate the MI in 802. For example, for each modulation type m:

$$c_{k,m}^l = f_m(c_k^l) \quad (2)$$

The resulting $f_m$ transformation conveys the channel capacity and mutual information $c_{k,m}^l$ for each of the MCS schemes, i.e. QPSK, 16-QAM, etc., in bits per channel versus the post-equalization SINR.

Thereafter, the MI may be averaged over all the sub-bands 804, and from there, the CSI computation can be performed to provide the RI, PMI, and wbCQI 806. The step of deriving the CSI (including the RI and PMI) from the average MI in 806 may include selecting a PMI in a manner which maximizes the sum of the spectral efficiency (SE) over all of the code words. The non-linear mapping function of the MI may be used in selecting an RI of the channel in a manner such that the sum of the SE over all available code words is maximized. Once the PMI and RI are determined, the MI is converted to CQI via non-linear mapping, Φ(x), to achieve the targeted BLER.

However, there are several drawbacks to computation model 800. For example, the wideband MI is used to select the wbCQI while the sub-band MI is used to select the sbCQI. As a result, this approach does not take into account the fact that the sbCQI, which is reported in differentials of the wbCQI, may take pessimistic values (i.e. an offset value≤0) in many sub-bands after mapping. This is shown in FIG. 7, where a majority of the sbCQI fall below that of the wbCQI. As scheduling schemes such as opportunistic scheduling tend to favor devices with better channel reporting, i.e. a higher CQI, reporting pessimistic sbCQI may lead to lower time-frequency allocation from the network access node(s).

In some aspects, methods and devices consider information loss during quantizing sbCQI and implement an approach to provide a positive skewness in sbCQI distribution with respect to the wbCQI. This approach may jointly determine both wbCQI and sbCQI, e.g. by lowering the wbCQI value in relation to the sbCQI values, to achieve a neutral or positive skewness sbCQI distribution, i.e. an equal or greater amount of sbCQI values than the wbCQI value. In this manner, a performance improvement of 5-20% in throughput may be achieved for a device when a plurality of devices are competing for network resources.

Figure 9:
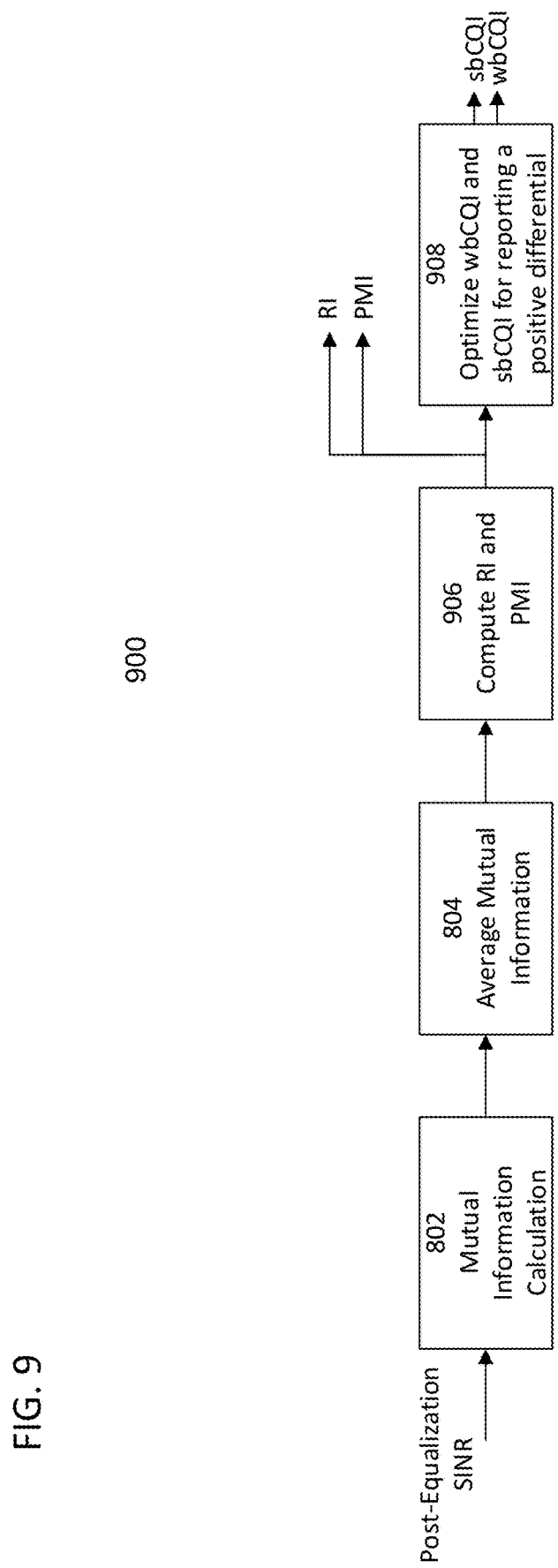
FIG. 9 shows a feedback estimation CSI computation model according to some aspects.

FIG. 9 shows a feedback estimation CSI computation model 900 configured to report a positive skewness in sbCQI distribution in some aspects. It is appreciated that model 900 is exemplary in nature and may therefore be simplified for purposes of this explanation.

Similar to the model shown in FIG. 8, the post-equalization SINR is used to calculate the Mutual Information (MI) 802, from which the average MI 804 is determined. However, in feedback estimation CSI computation model 900, from the average MI, both the RI and the PMI are computed in 906. From these parameters, the wbCQI and sbCQI are determined and optimized for reporting a positive skewness in the differential of sbCQI using the wbCQI 908.

By implementing feedback estimation CSI computation model 900, the methods and devices disclosed herein provide schemes to determine the sbCQI distribution in order to quantize sbCQI to achieve a neutral or positive skewness distribution of sbCQI values with respect to the wbCQI. Further, the sbCQI distribution is used for joint optimization of wbCQI and sbCQI. The "skewness" of the distribution of the sbCQI with respect to the wbCQi (e.g. neutral, negative, or positive) is a measure of the asymmetry of a distribution, and in this case, is used in determining the distribution of the reported sbCQI to the network for the purpose of improving the time-frequency resources received by the UE (i.e. terminal device).

For purposes of the ensuing explanation with respect to feedback estimation CSI computation model 900, Φ(x) denotes the non-linear MI to CQI mapping for both the wideband and the sub-band(s), where Φ(x) is selected to achieve a target BLER for a given receiver, e.g. in LTE, this could be 10%. $C_{k,l}$ denotes the MI of sub-band k and codeword 1, and $C_l$ denotes the wideband MI at an instance in time. Then, the sbCQI which is internally maintained by the UE, prior applying quantization Q(x), may be computed as $sbCQI\_i_{k,l}=\Phi(C_{k,l})$ for sub-band k and codeword 1. Similarly, the $wbCQI_l$ for codeword 1 may be computed as $wbCQI_l=\Phi(C_l)$. Since both the wbCQI and sbCQI_i can only take on discrete values from 0 to 15 in LTE systems, some information contained in the MI may be lost during the mapping process. Let $\Phi(sbCQI\_i_{k,l})$ denote the MI of sub-band k and codeword 1 after the mapping process. Equation (3) provides an example to check for information loss, denoted by $\Psi(C_{k,l}, \Phi^{-1}(sbCQI\_i_{k,l}))$, during the mapping process and increases the sbCQI by 1 if the information loss exceeds a threshold, denoted by $C_{k,l}^{th}$ for sub-band k and codeword 1:

$$\text{if } \Psi(C_{k,l},\Phi^{-1}(sbCQI_{i_{k,l}})) \geq C_{k,l}^{th}$$

$$sbCQI_{i_{k,l}} = sbCQI_{i_{k,l}} + 1$$

$$\text{end} \quad (3)$$

The threshold $C_{k,l}^{th}$ may be set to a predetermined value for all scenarios and may be based on a target BLER.

To determine the skewness of the sbCQI values with respect to the wbCQI, Equation (4) is used:

$$\Delta = \sum_l \sum_k \Omega(sbCQI_{i_{k,l}} - wbCQI_l) \quad (4)$$

Where Ω(x) is a function that returns a negative value when x<0, and positive values when x≥0, and Δ is the skewness, which may be used to determine whether there are a sufficient number of sbCQIs that have a higher value than the wbCQI by checking against the skewness threshold, $\Delta_{th}$. If the skewness of the sbCQI is negative ($\Delta<\Delta_{th}$), the wbCQI is recomputed by lowering the wideband MI by an offset, denoted as $C_{offset}$ in MI diagram 1000 in FIG. 10. 3GPP TS 36.101 requires a number of sbCQI with an offset of 0 be at least a %, e.g. 2%, but not less than β%, e.g. 50%, for each sub-band for a given fading channel. $\Theta_p$ is defined as the pth percentile of MI for all sub-bands at a given point in time, where p is selected between α% and β%. In some aspects, in order to satisfy the 3GPP requirements, $C_{offset}$ is selected to be $C_{offset}$=wbMI−$\Theta_p$. By lowering the wideband MI by $C_{offset}$, the computed wbCQI is also lowered and thus the number of sbCQI higher than the wbCQI is increased (as seen in CQI diagram 1050 in FIG. 10 as wbCQI$_{old}$ is lowered to wbCQI$_{new}$). Then, the sbCQI_i is quantized based on Q(x) and reported to the network in the defined 2-bit format for each sub-band.

Figure 10:
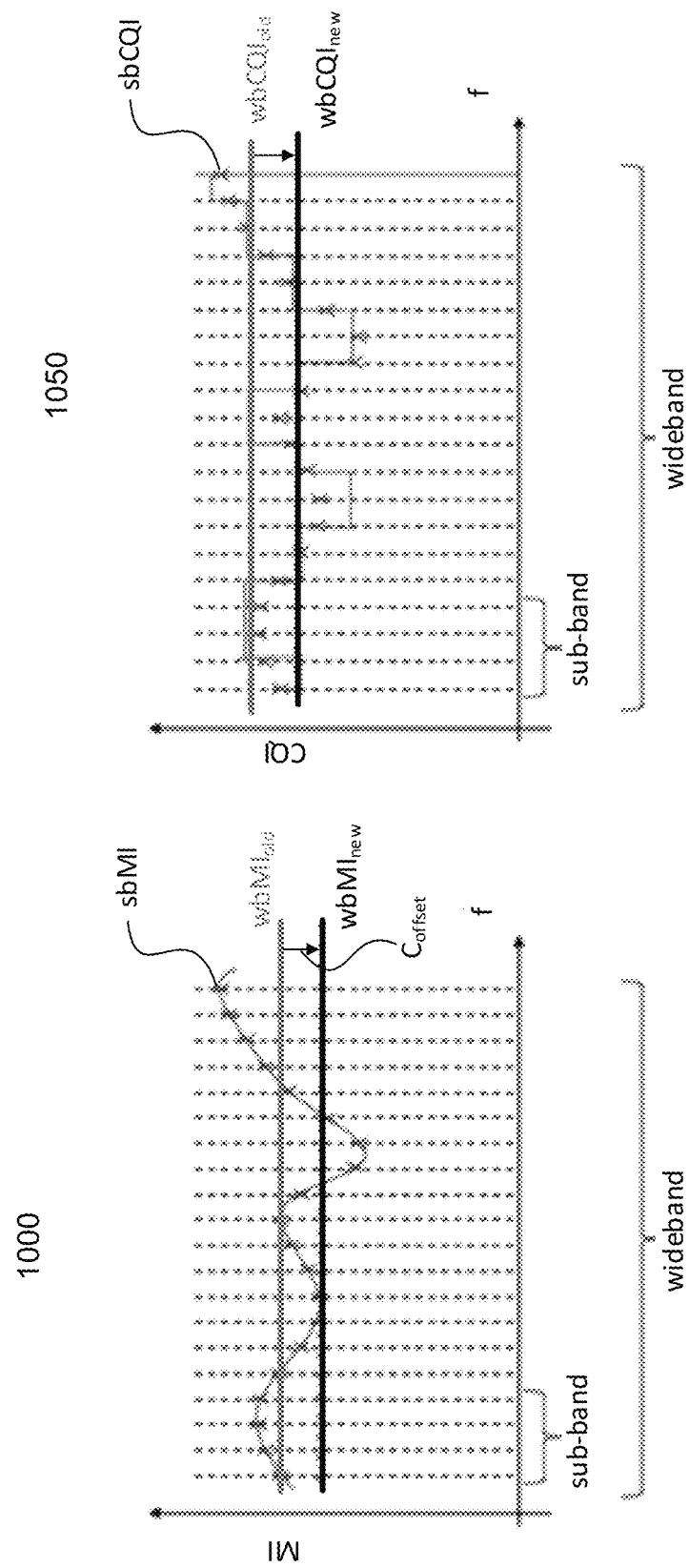
FIG. 10 shows exemplary diagrams for the Mutual Information (MI) and the Channel Quality Indicator (CQI) mapping for each sub-band across the wideband according to some aspects.

In some aspects, the optimization of the wbCQI and sbCQI block 908 is configured to jointly select the wbCQI and sbCQI in order to report a positive skewness of the sbCQI with respect to the wbCQI to the network. For example, optimization of the wbCQI and sbCQI block 908 may be configured to perform the following:

wbCQI$_l$=Φ (C$_l$) for each l (where the non-linear MI to CQI mapping and l is the code word)
for each k, l: (where k is the sub-band)
   sbCQI_i$_{k,l}$=Φ(C$_{k,l}$)
   if C$_{k,l}$≥C$_{k,l}^{th}$: (where C$_{k,l}^{th}$ is a pre-determined threshold for information loss due to quantization)
      sbCQI_i$_{k,l}$=sbCQI_i$_{k,l}$+1
end
Δ=Σ$_l$Σ$_k$Ω(sbCQI$_{i_{k,l}}$−wbCQI$_l$) (where Δ is the skewness of sbCQI relative to wbCQI)
if Δ<Δ$_{th}$ (where Δ$_{th}$ is the skewness threshold to determine whether the skewness is negative)
   wbCQI$_l$=Φ(C$_1$−C$_{offset}$) for each l
   sbCQI_i$_{k,l}$=Q(sbCQI_i$_{k,l}$−wbCQI$_l$) for each k,l FIG. 10 shows exemplary diagrams for the Mutual Information (MI) 1000 and the Channel Quality Indicator (CQI) 1050 for each sub-band across the wideband implementing feedback estimation modeling according to feedback estimation CSI computational model 900 in some aspects.

In diagram 1000, the MI is plotted against the frequency (f). Similarly as in FIG. 7, each marked point along the curve represents the MI for a sub-band component of the wideband. The initial wbMI is shown as wbMI$_{old}$, i.e. the top line. After determining the MI for the wideband (wbMI) and the MI for each sub-band (sbMI), the wbCQI and the wbCQI may be determined, respectively. However, similar to the scenario demonstrated in FIG. 7, there is a negative skewness of the sbCQI with respect to the wbCQI, that is Δ<Δ$_{th}$. Accordingly, the wbMI is reduced by C$_{offset}$, so a new wbMI, i.e. wbMI$_{new}$, is to determine the new wbCQI (wbCQI$_{new}$) to use in CQI reporting back to the network access node. In sum, the negative skewness of sbCQI distribution with respect to the wbCQI is detected (only two sbCQI higher than wbCQI$_{old}$), and the wbMI is re-adjusted to a lower value (to wbMI$_{new}$) such that the number of sub-bands with an sbCQI value higher than the wbCQI is increased (at least 12 sub-bands have an sbCQI value greater than wbCQI$_{new}$, resulting in a positive skewness of sbCQI with respect to the wbCQI in CSI feedback reporting to the network).

To illustrate the performance gain, lab tests on a 4G network were conducted in a controlled environment with two UEs (i.e., K=2) competing for shared resources on a commercial eNB at the same time. The first UE, denoted as device under test (DUT), is configured with the schemes and methods disclosed herein while the second UE, denoted as reference (REF), employs the legacy approach in CQI reporting. The two UEs were configured to observe an identical fading channel. Standard-defined fading channels profile (EPA5 and ETU70) were selected to represent typical wireless channels that may be observed in the field. An SINR sweep is then applied to both devices to measure performance under various coverage scenarios. A User Datagram Profile (UDP) server was used to transfer data of equal amount to both UEs, and the rate of the transferred of data is measured in throughput for both UEs. Both UEs were configured to receive the same QoS (i.e., the same application is used to generate traffic for the two UEs, therefore the eNB does not differentiate the traffic of the devices at Layer 2/3).

Table 2 shows the performance comparison between two UEs. Each (SINR, fading profile) pair was repeated 5× for statistical reliability and the sum of throughput for all 5 iterations across all SINR points (SINR=30, 20, 10, 0, −5 dB) for each fading profile is reported in Table 2. A 5-25% of performance gain over legacy approach is seen.

TABLE 2

| Fading model | EPA5 (low antenna correlation) | EPA 5 (high antenna) correlation | ETU70 (low antenna correlation) | ETU70 (high antenna correlation) |
| --- | --- | --- | --- | --- |
| DUT | 475 Mbps | 346 Mbps | 513 Mbps | 375 Mbps |
| REF | 454 Mbps | 279 Mbps | 472 Mbps | 310 Mbps |

Because the eNB uses a combination of opportunistic scheduling and fair scheduling to achieve an optimal total throughout while maintaining fairness in resource access among competing users, the first UE configured to report the positively weighed sbCQI as discussed herein (DUT, first row of Table 2) indicates a better channel condition to the eNB across different bands, and therefore, has a higher likelihood of receiving allocation of resources if the eNB employs any degree of opportunistic scheduling.

Figure 11:
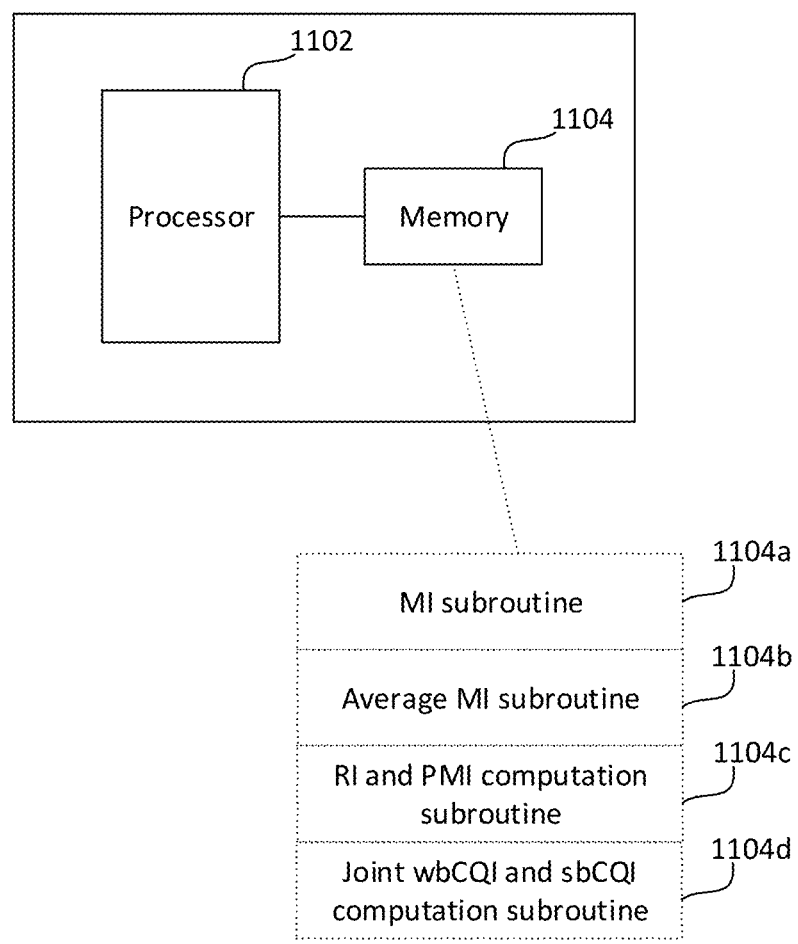
FIG. 11 shows an exemplary internal configuration of controller according to some aspects.

FIG. 11 shows an exemplary internal configuration of controller 210 according to some aspects. As shown in FIG. 11, controller 210 may include processor 1102 and memory 1104. Processor 1102 may be a single processor or multiple processors, and may be configured to retrieve and execute program code to perform the transmission and reception, channel resource allocation, and cluster management as described herein. Processor 1102 may transmit and receive data over a software-level connection that is physically transmitted as wireless radio signals by digital signal processor 208, RF transceiver 204, and antenna 202. Memory 1104 may be a non-transitory computer readable medium storing instructions for one or more of a mutual information (MI) subroutine 1104*a*, an average MI subroutine 1104*b*, an RI and PMI subroutine 1104*c*, and/or a joint wbCQI and sbCQI computation subroutine 1104*d*.

MI subroutine 1004*a*, average MI subroutine 1104*b*, RI and PMI subroutine 1104*c*, and joint wbCQI and sbCQI computation subroutine 1104*d* may each be an instruction set including executable instructions that, when retrieved and executed by processor 1102, perform the functionality of controller 210 as described herein. In particular, processor 1102 may execute MI subroutine 1004*a* to the MI of a wideband and one or more sub-bands therein. As previously described, MI subroutine 1004*a* may therefore include executable instructions for determining the MI from the post-equalization SINR. For example, this may include deriving the MI dependent on the modulation type by first calculating the hypothetical capacity for each code word and then applying a non-linear transform to model the actual modulation type and the receiver specific demapper implementation.

Processor 1102 may execute average MI subroutine 1104*b* for sub-band MI averaging. Average MI subroutine 1104*b* may therefore include executable instructions that perform an averaging of the MI of the sub-bands determined from MI subroutine 1104a. Processor 1102 may execute RI and PMI subroutine 1104c in order to compute the RI and the PMI, which may include individually selecting a PMI and an RI which maximize the sum spectral efficiency over all of the code words.

Processor 1102 may execute joint wbCQI and sbCQI computation subroutine 1104d for determining the wbCQI and sbCQI and optimizing the values for reporting to the network such a positive skewness in the differential of sbCQI using the wbCQI is reported. As previously described, joint wbCQI and sbCQI computation subroutine 1104d may therefore include executable instructions for determining the wbCQI and the sbCQI for a plurality of sub-bands, checking for an information loss in the mapping process and increasing the sbCQI if the information loss exceeds a predetermined threshold, determining a skewness of the number of sbCQIs with a higher value than the wbCQI, and modifying the wbCQI in the case that the sbCQI is negatively weighed such that a positive (or neutral) skewness of sbCQI to wbCQI is reported in the feedback signal to the network.

Figure 12:
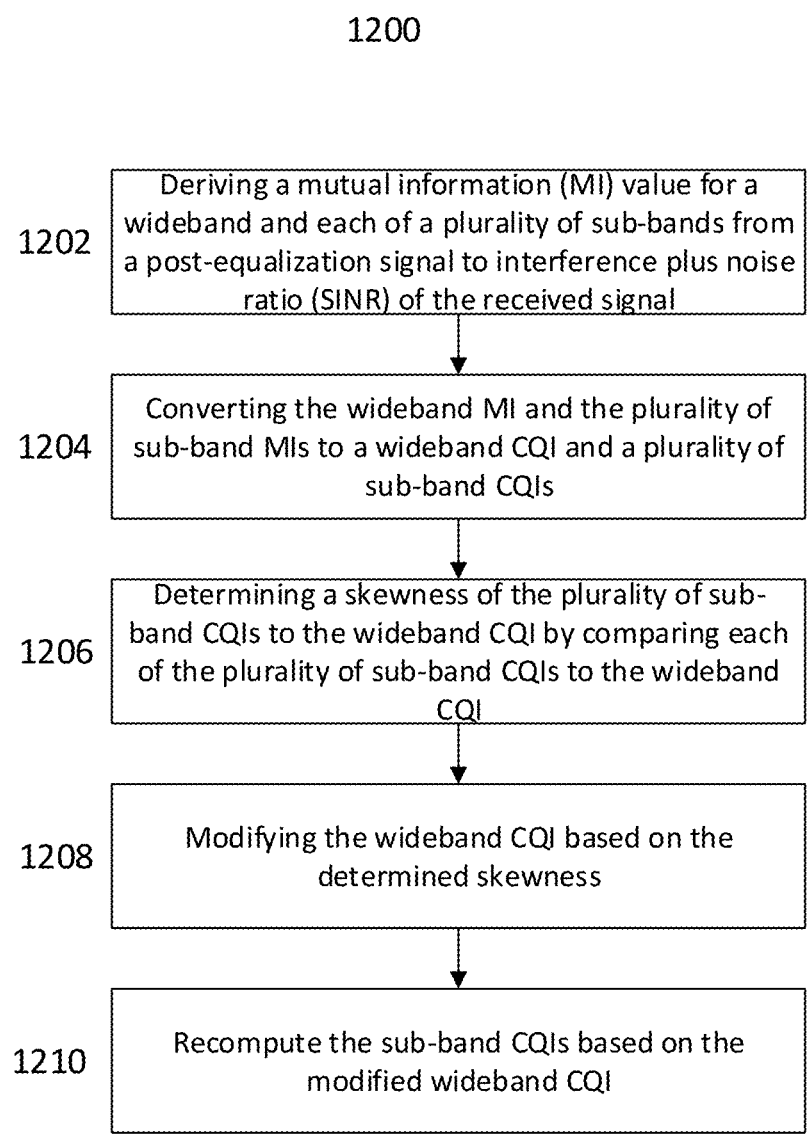
FIG. 12 shows a flowchart describing a method for determining Channel Quality Indicators according to some aspects.

FIG. 12 shows a flowchart 1200 showing a method for determining a wideband Channel Quality Indicator (wbCQI) and a plurality of sub-band Channel Quality Indicators (CQIs) in some aspects. It is appreciated that flowchart 1200 is exemplary in nature and may therefore be simplified for purposes of this explanation.

Prior to implementing the method shown by flowchart 1200, the receiving communication device may process a received signal in an OFDM communication scheme according to known signal processing methods in order to obtain the post-equalization SINR. For example, this may include receiving the OFDM signal with an antenna and performing front-end processing of the received OFDM signal, and furthermore, removing the guard intervals, FFT processing, noise level estimation, channel estimation, and normalization of the received data symbols prior to implementing the feedback estimation CSI computation methods described herein. Accordingly, it is appreciated that baseband modem 206 is also fitted with hardware and/or software to perform these functions.

Flowchart 1200 shows a method for determining a wideband Channel Quality Indicator (wbCQI) and a plurality of sub-band Channel Quality Indicators (CQIs) for reporting to a network. The method may include deriving a mutual information (MI) value for a wideband and each of a plurality of sub-bands from a post-equalization signal to interference plus noise ratio (SINR) of the received signal 1202; converting the wideband MI and the plurality of sub-band MIs to a wideband CQI and a plurality of sub-band CQIs 1204; determining a skewness of the plurality of sub-band CQIs to the wideband CQI by comparing each of the plurality of sub-band CQIs to the wideband CQI 1206; and modifying the wideband CQI based on the determined skewness 1208. In 1210, the communication device recomputes the sub-band CQIs based on the modified wideband CQI. The communication device may then provide the modified wideband CQI and one or more modified sub-band CQIs (based on the modified wideband CQI) in the CSI reporting back to the network access node.

Figure 13:
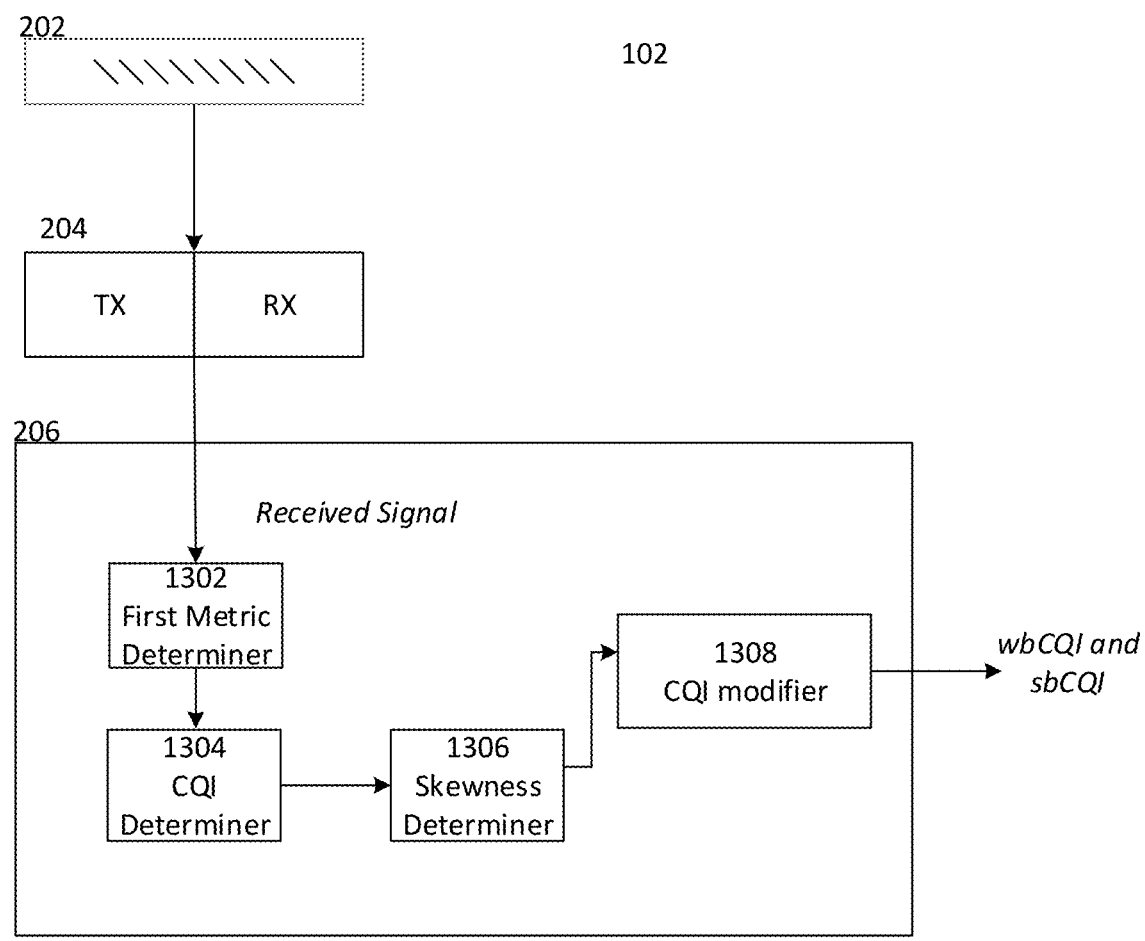
FIG. 13 shows a circuit configuration of a terminal device according to some aspects.

FIG. 13 shows an internal diagram a terminal device 102 depicting components according to some aspects. Accordingly, the illustrated depiction of FIG. 13 may omit certain components of terminal device 102 that are not directly related to methods described herein. Additionally, components depicted as being separate in FIG. 13 may be incorporated into a single, hybrid component that performs the same functions as the separate components, and, similarly, single components may be split into two or more separate components that perform the same function as the single component.

As shown in FIG. 13, the baseband modem 206 may include circuitry for determining CQIs for higher resource allocation from a network, such as first metric determiner circuitry 1302 configured to calculate a first metric from a signal received at the communication device. For example, this may include calculating the MI (for the WB and for the sub-bands) from a received post-equalization SINR as described herein. Baseband modem 206 may further include CQI determiner circuitry 1304 configured to receive the output of first metric determiner 1302 and determine a wideband CQI and a plurality of sub-band CQIs from the first metric. Baseband modem 206 may further include skewness determiner circuitry 1306 for determining a skewness of the plurality of sub-band CQIs to the wideband CQI, wherein a negative skewness indicates a greater proportion of the plurality of sub-band CQIs with a value lower than the wideband CQI as described herein. Baseband modem may further include CQI modifier circuitry 1308 configured to modify the wideband CQI based on the determined skewness and recompute the plurality of sub-band CQIs based on the modified wideband CQI as described herein.

Figure 14:
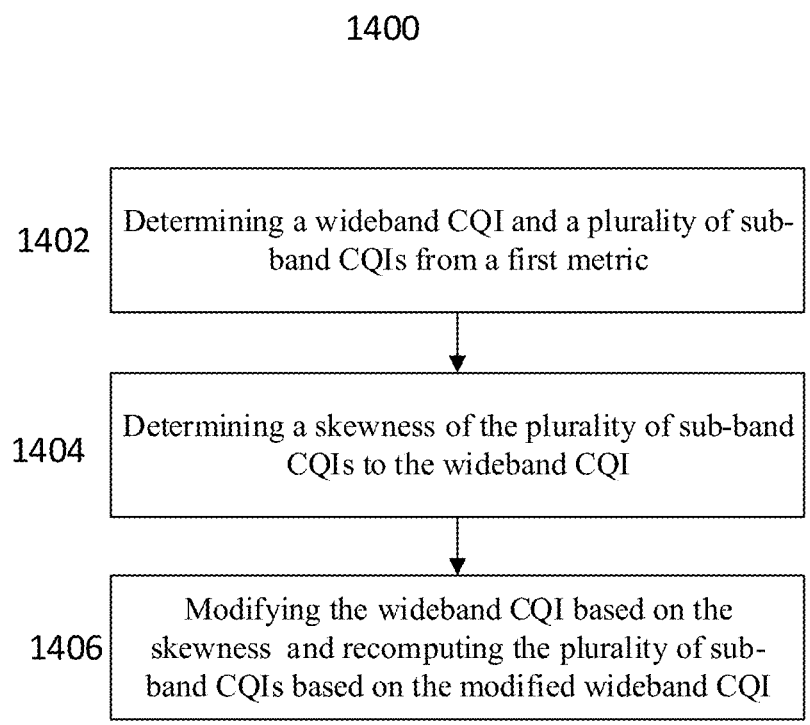
FIG. 14 shows a flowchart according to some aspects.

FIG. 14 shows a flowchart 1400 for determining CQI(s) for higher resource allocation according to some aspects. It is appreciated that flowchart 1400 is exemplary in nature and may therefore be simplified for purposes of this explanation.

In 1402, the wideband CQI and a plurality of sub-band CQIs are determined from a first metric. The first metric may be determined from a received signal, and may include a mutual information (MI) or other metric, such as post-processing signal-to-noise ratio (SNR), post-processing capacity information, or other similar metrics which may be determined from a signal received at a communication device.

In 1404, a skewness of the plurality of sub-band CQIs to the wideband CQI is determined. A negative skewness indicates a greater proportion of the plurality of sub-band CQIs with a value lower than the wideband CQI than sub-band CQIS with a value higher than the wideband CQI.

In 1406, the wideband CQI is modified based on the skewness and the plurality of sub-band CQIs are recomputed based on the modified wideband CQI.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

In Example 1, a communication device including: a Channel Quality Indicator (CQI) determiner configured to determine a wideband CQI and a plurality of sub-band CQIs from a first metric; a skewness determiner configured to determine a skewness of the plurality of sub-band CQIs to the wideband CQI; and a CQI modifier configured to modify the wideband CQI based on the skewness and recompute the plurality of sub-band CQIs based on the modified wideband CQI. In some aspects, the communication device may also include a first metric determiner configured to determine the first metric for a wideband and a plurality of sub-bands in the wideband from a post-equalization signal-to-interference-plus-noise-ratio (SINR). The first metric may be a Mutual Information (MI), or other metric, such as post-processing signal-to-noise ratio (SNR), post-processing capacity information, or other similar metrics which may be determined from a signal received at the communication device.

In Example 2, the subject matter of Example(s) 1 may include wherein the skewness determiner is configured to determine a negative skewness when a greater proportion of the plurality of sub-band CQIs is lower than the wideband CQI and wherein the CQI modifier is configured to modify the wideband CQI when the negative skewness is determined.

In Example 3, the subject matter of Example(s) 2 may include when the skewness determiner determines the negative skewness, the CQI modifier is configured to lower the wideband CQI.

In Example 4, the subject matter of Example(s) 3 may include wherein the CQI modifier is configured to lower the wideband CQI by lowering the wideband MI by an offset.

In Example 5, the subject matter of Example(s) 4 may include wherein the offset is determined from the wideband MI and a percentile of sub-band MIs.

In Example 6, the subject matter of Example(s) 5 may include wherein the percentile is between a lower percentile limit and an upper percentile limit.

In Example 7, the subject matter of Example(s) 6 may include wherein the lower percentile limit is about 2% and the upper percentile limit is about 50%.

In Example 8, the subject matter of Example(s) 4-7 may include wherein the CQI modifier is configured to recompute the wideband CQI based on the lowered wideband MI.

In Example 9, the subject matter of Example(s) 4-8 may include wherein lowering the wideband MI by the offset lowers the value of the wideband CQI so that a positive skewness is achieved, wherein the positive skewness indicates at least an equal proportion of the plurality of modified sub-band CQIs equal to or greater than the modified wideband CQI.

In Example 10, the subject matter of Example(s) 1-9 may include wherein the post-equalization SINR is determined from a received signal.

In Example 11, the subject matter of Example(s) 1-10 may include a checker configured to check for an information loss incurred in the converting of the wideband MI and the plurality of sub-band MIs to the wideband CQI and the plurality of sub-band CQIs, respectively.

In Example 12, the subject matter of Example(s) 11 may include wherein the checking for the information loss comprises comparing a post-conversion MI value of each of the plurality of sub-bands to a threshold value.

In Example 13, the subject matter of Example(s) 11-12 may include wherein the CQI of a respective sub-band is increased when the loss after post-conversion of the MI value of the respective sub-band is greater than or equal to the threshold value.

In Example 14, the subject matter of Example(s) 1-13 may include the CQI determiner further configured to determine a precoding matrix (PMI) and a rank indication (RI) based on the MI.

In Example 15, the subject matter of Example(s) 14 may include wherein the PMI is selected from one or more PMI candidates such that it maximizes the sum of spectral efficiency over the received signal.

In Example 16, the subject matter of Example(s) 14-15 may include wherein the RI is selected such that a sum of spectral efficiency is maximized.

In Example 17, a communication device configured to determine a channel state information (CSI), including a wideband Channel Quality Indicator (CQI) and a plurality of sub-band CQIs, from a received signal, the communication device comprising one or more processors configured to derive a first metric for a wideband and each of a plurality of sub-bands from a post-equalization signal to interference plus noise ratio (SINR) of the received signal; convert the wideband first and the plurality of sub-band first metrics to a wideband CQI and a plurality of sub-band CQIs; determine a skewness of the plurality of sub-band CQIs to the wideband CQI by comparing each of the plurality of sub-band CQIs to the wideband CQI; modify the wideband CQI based on the determined skewness and modify the plurality of sub-band CQIs based on the modified wideband CQI; and provide the modified wideband CQI and modified plurality of sideband CQIs in the CSI. The first metric may be a Mutual Information (MI) or other metric, such as post-processing signal-to-noise ratio (SNR), post-processing capacity information, or other similar metrics which may be determined from a received signal.

In Example 18, the subject matter of Example(s) 17 may include wherein the modifying of the wideband CQI comprises lowering a value of the wideband CQI when a negative skewness is determined, wherein the negative skewness indicates a greater number of sub-band CQIs with a value lower than the wideband CQI than equal to or greater than the wideband CQI.

In Example 19, the subject matter of Example(s) 18 may include wherein the wbCQI is lowered by lowering the corresponding wideband first metric by an offset.

In Example 20, the subject matter of Example(s) 19 may include wherein the offset is determined from the wideband first metric and a percentile of sub-band first metrics.

In Example 21, the subject matter of Example(s) 20 may include wherein the percentile is between a lower percentile limit and an upper percentile limit.

In Example 22, the subject matter of Example(s) 21 may include wherein the lower percentile limit is about 2% and the upper percentile limit is about 50%.

In Example 23, the subject matter of Example(s) 19-22 may include wherein lowering the wideband first metric by the offset lowers the value of the wideband CQI so that a positive skewness is achieved, wherein the positive skewness comprises at least an equal amount of sub-band CQIs with a value greater than the wideband CQI than lower than the wideband CQI.

In Example 24, the subject matter of Example(s) 17-23 may include the one or more processors further configured to check for an information loss incurred in the converting of the wideband MI and the plurality of sub-band MIs to the wideband CQI and the plurality of sub-band CQIs.

In Example 25, the subject matter of Example(s) 24 may include wherein the checking for the information loss comprises comparing a post-conversion MI value of each of the plurality of sub-bands to a threshold value.

In Example 26, the subject matter of Example(s) 25 may include wherein the sub-band CQI of a respective sub-band is increased when a loss after post-conversion MI value of the respective sub-band is greater than or equal to the threshold value.

In Example 27, the subject matter of Example(s) 17-26 may include the one or more processors further configured to select a precoding matrix (PMI) and a rank indication (RI) based on the mutual information.

In Example 28, the subject matter of Example(s) 27 may include wherein the PMI is selected from one or more PMI candidates such that it maximizes the sum of spectral efficiency over the received signal.

In Example 29, the subject matter of Example(s) 28 may include wherein the RI is selected from one or more RI candidates such that it maximizes the sum of spectral efficiency over the received signal.

In Example 30, the subject matter of Example(s) 17-29 may include a transmitter configured to transmit the CSI to a network.

In Example 31, a method including determining a first metric for a wideband and a plurality of sub-bands in the wideband from a post-equalization signal-to-interference-plus-noise-ratio (SINR); determining a wideband Channel Quality Indicator (CQI) and a plurality of sub-band CQIs from the first metric; determining a skewness of the plurality of sub-band CQIs to the wideband CQI; and modifying the wideband CQI based on the skewness and recomputing the plurality of sub-band CQIs based on the modified wideband CQI. The first metric may be a Mutual Information (MI) or other metric, such as post-processing signal-to-noise ratio (SNR), post-processing capacity information, or other similar metrics which may be determined from a received signal.

In Example 32, the subject matter of Example(s) 31 may include determining a negative skewness when a greater proportion of the plurality of sub-band CQIs is lower than the wideband CQI and modifying the wideband CQI when the negative skewness is determined.

In Example 33, the subject matter of Example(s) 32 may include lowering the wideband CQI when the negative skewness is determined.

In Example 34, the subject matter of Example(s) 33 may include wherein lowering the wideband CQI comprises lowering the wideband MI by an offset.

In Example 35, the subject matter of Example(s) 34 may include wherein the offset is determined from the wideband first metric and a percentile of sub-band first metrics.

In Example 36, the subject matter of Example(s) 35 may include wherein the percentile is between a lower percentile limit and an upper percentile limit.

In Example 37, the subject matter of Example(s) 36 may include wherein the lower percentile limit is about 2% and the upper percentile limit is about 50%.

In Example 38, the subject matter of Example(s) 34-37 may include recomputing the wideband CQI based on the lowered wideband first metric.

In Example 39, the subject matter of Example(s) 34-38 may include wherein lowering the wideband first metric by the offset lowers the value of the wideband CQI so that a positive skewness is achieved, wherein the positive skewness indicates at least an equal proportion of the plurality of modified sub-band CQIs equal to or greater than the modified wideband CQI.

In Example 40, the subject matter of Example(s) 31-39 may include determining the post-equalization SINR from a received signal.

In Example 41, the subject matter of Example(s) 31-40 may include checking for an information loss incurred in the converting of the wideband first metric and the plurality of sub-band first metrics to the wideband CQI and the plurality of sub-band CQIs, respectively.

In Example 42, the subject matter of Example(s) 41 may include wherein the checking for the information loss comprises comparing a post-conversion first metric value of each of the plurality of sub-bands to a threshold value.

In Example 43, the subject matter of Example(s) 41 may include wherein the CQI of a respective sub-band is increased when the loss after post-conversion of the first metric value of the respective sub-band is greater than or equal to the threshold value.

In Example 44, the subject matter of Example(s) 31-43 may include determining a precoding matrix (PMI) and a rank indication (RI) based on the first metric.

In Example 45, the subject matter of Example(s) 44 may include wherein the PMI is selected from one or more PMI candidates such that it maximizes the sum of spectral efficiency over the received signal.

In Example 46, the subject matter of Example(s) 44-45 may include wherein the RI is selected such that a sum of spectral efficiency is maximized.

In Example 47, a method for a communication device to determine a wideband Channel Quality Indicator (wbCQI) and a plurality of sub-band Channel Quality Indicators (CQIs) for reporting to a network, the method including deriving a first metric for a wideband and each of a plurality of sub-bands from a signal at the communication device; converting the wideband first metric and the plurality of sub-band first metrics to a wideband CQI and a plurality of sub-band CQIs; determining a skewness of the plurality of sub-band CQIs to the wideband CQI by comparing each of the plurality of sub-band CQIs to the wideband CQI; modifying the wideband CQI based on the determined skewness and modifying the plurality of sub-band CQIs based on the modified wideband CQI; and providing the modified wideband CQI and modified plurality of sideband CQIs in the CSI. In some aspects, the first metric may be a Mutual Information (MI) for a wideband and each of a plurality of sub-bands which are determined from a post-equalization signal to interference plus noise ratio (SINR), or it may be another metric, such as post-processing signal-to-noise ratio (SNR), post-processing capacity information, or other similar metrics which may be determined from a signal received at the communication device.

In Example 48, the subject matter of Example(s) 47 may include wherein the modifying of the wideband CQI comprises lowering a value of the wideband CQI when a negative skewness is determined, wherein the negative skewness indicates a greater number of sub-band CQIs with a value lower than the wideband CQI than equal to or greater than the wideband CQI.

In Example 49, the subject matter of Example(s) 48 may include wherein the wbCQI is lowered by lowering the corresponding wideband first metric by an offset.

In Example 50, the subject matter of Example(s) 49 may include wherein the offset is determined from the wideband first metric and a percentile of sub-band first metrics.

In Example 51, the subject matter of Example(s) 50 may include wherein the percentile is between a lower percentile limit and an upper percentile limit.

In Example 52, the subject matter of Example(s) 51 may include wherein the lower percentile limit is about 2% and the upper percentile limit is about 50%.

In Example 53, the subject matter of Example(s) 49-52 may include wherein lowering the wideband first metric by the offset lowers the value of the wideband CQI so that a positive skewness is achieved, wherein the positive skewness comprises at least an equal amount of sub-band CQIs with a value greater than the wideband CQI than sub-bands CQIS with a value lower than the wideband CQI.

In Example 54, the subject matter of Example(s) 47-53 may include checking for an information loss incurred in the converting of the wideband first metric and the plurality of sub-band first metrics to the wideband CQI and the plurality of sub-band CQIs.

In Example 55, the subject matter of Example(s) 54 may include wherein the checking for the information loss comprises comparing a post-conversion first metric value of each of the plurality of sub-bands to a threshold value.

In Example 56, the subject matter of Example(s) 55 may include wherein the sub-band CQI of a respective sub-band is increased when a loss after post-conversion first metric value of the respective sub-band is greater than or equal to the threshold value.

In Example 57, the subject matter of Example(s) 47-56 may include selecting a precoding matrix (PMI) and a rank indication (RI) based on the first metric.

In Example 58, the subject matter of Example(s) 57 may include wherein the PMI is selected from one or more PMI candidates such that it maximizes the sum of spectral efficiency over the received signal.

In Example 59, the subject matter of Example(s) 58 may include wherein the RI is selected from one or more RI candidates such that it maximizes the sum of spectral efficiency over the received signal.

In Example 60, the subject matter of Example(s) 47-59 may include further comprising transmitting the CSI to a network.

In Example 61, a communication device including means for determining a first metric for a wideband and a plurality of sub-bands from a received signal; means for determining a wideband Channel Quality Indicator (CQI) from the wideband first metric and determine a plurality of sub-band CQIs from the plurality of sub-band first metrics; means for determining a skewness of the plurality of sub-band CQIs to the wideband CQI; and means for modifying the wideband CQI based on the skewness and recomputing the plurality of sub-band CQIs based on the modified wideband CQI. In some aspects, the first metric may be a Mutual Information (MI) for a wideband and each of a plurality of sub-bands which are determined from a post-equalization signal to interference plus noise ratio (SINR), or it may be another metric, such as post-processing signal-to-noise ratio (SNR), post-processing capacity information, or other similar metrics which may be determined from a signal received at the communication device.

In Example 62, a communication device including means for deriving a mutual information (MI) value for a wideband and each of a plurality of sub-bands from a post-equalization signal to interference plus noise ratio (SINR) of the received signal; means for converting the wideband MI and the plurality of sub-band MIs to a wideband CQI and a plurality of sub-band CQIs; means for determining a skewness of the plurality of sub-band CQIs to the wideband CQI by comparing each of the plurality of sub-band CQIs to the wideband CQI; means for modifying the wideband CQI based on the determined skewness and modifying the plurality of sub-band CQIs based on the modified wideband CQI; and means for providing the modified wideband CQI and modified plurality of sideband CQIs in the CSI.

In Example 63, one or more non-transitory computer-readable media storing instructions thereon that, when executed by at least one processor of a communication device, direct the communication device to perform a method of any preceding Example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a Channel Quality Indicator (CQI) determiner configured to determine a wideband CQI and a plurality of sub-band CQIs from a first metric;
    a skewness determiner configured to determine a skewness of the plurality of sub-band CQIs to the wideband CQI; and
    a CQI modifier configured to modify the wideband CQI based on the skewness and recompute the plurality of sub-band CQIs based on the modified wideband CQI, the CQI modifier further configured to modify a channel station information (CSI) reporting based on the modified wideband CQI and/or the recomputed plurality of sub-band CQIs.

2. The communication device of claim 1, wherein the skewness determiner is configured to determine a negative skewness when a greater proportion of the plurality of sub-band CQIs is lower than the wideband CQI and wherein the CQI modifier is configured to modify the wideband CQI when the negative skewness is determined.

3. The communication device of claim 2, wherein when the skewness determiner determines the negative skewness, the CQI modifier is configured to lower the wideband CQI.

4. The communication device of claim 1, further comprising a first metric determiner configured to determine the first metric for a wideband and a plurality of sub-bands in the wideband from a post-equalization signal-to-interference-plus-noise-ratio (SINR), wherein the first metric is a Mutual Information (MI).

5. The communication device of claim 4, wherein the CQI modifier is configured to lower the wideband CQI by lowering a wideband MI by an offset.

6. The communication device of claim 5, wherein the offset is determined from the wideband MI and a percentile of sub-band MIs.

7. The communication device of claim 6, wherein the percentile is between a lower percentile limit and an upper percentile limit.

8. The communication device of claim 7, wherein the CQI modifier is configured to recompute the wideband CQI based on the lowered wideband MI.

9. The communication device of claim 8, wherein lowering the wideband MI by the offset lowers the value of the wideband CQI so that a positive skewness is achieved, wherein the positive skewness indicates at least an equal proportion of the plurality of modified sub-band CQIs equal to or greater than the modified wideband CQI.

10. The communication device of claim 4, further comprising a checker configured to check for an information loss incurred in the converting of the wideband MI and the plurality of sub-band MIs to the wideband CQI and the plurality of sub-band CQIs, respectively.

11. The communication device of claim 10, wherein the checking for the information loss comprises comparing a post-conversion MI value of each of the plurality of sub-bands to a threshold value.

12. The communication device of claim 10, wherein the CQI of a respective sub-band is increased when the loss after post-conversion of the MI value of the respective sub-band is greater than or equal to the threshold value.

13. The communication device of claim 4, wherein the post-equalization SINR is determined from a signal received at the communication device.

14. The communication device of claim 1, the CQI determiner further configured to determine a precoding matrix (PMI) and a rank indication (RI) based on the first metric.

15. A method comprising:
determining a first metric from a received signal;
determining a wideband Channel Quality Indicator (CQI) and a plurality of sub-band CQIs based on the first metric;
determining a skewness of the plurality of sub-band CQIs to the wideband CQI;
modifying the wideband CQI based on the skewness and recomputing the plurality of sub-band CQIs based on the modified wideband CQI; and
modifying a channel state information (CSI) reporting based on the modified wideband CQI and/or the recomputed plurality of sub-band CQIs.

16. The method of claim 15, further comprising determining a negative skewness when a greater proportion of the plurality of sub-band CQIs is lower than the wideband CQI and modifying the wideband CQI when the negative skewness is determined.

17. The method of claim 16, further comprising lowering the wideband CQI when the negative skewness is determined.

18. The method of claim 17, wherein the first metric is a Mutual Information (MI), wherein the wbCQI is lowered by lowering a corresponding wideband MI by an offset so that a positive skewness is achieved, wherein the positive skewness comprises at least an equal amount of sub-band CQIs with a value greater than the wideband CQI than lower than the wideband CQI.

19. One or more non-transitory computer-readable media storing instructions thereon that, when executed by at least one processor of a communication device, direct the communication device to:
determine a first metric from a signal received at the communication device;
determine a wideband Channel Quality Indicator (CQI) and a plurality of sub-band CQIs from the first metric;
determine a skewness of the plurality of sub-band CQIs to the wideband CQI;
modify the wideband CQI based on the skewness and recompute the plurality of sub-band CQIs based on the modified wideband CQI; and
modify a channel state information (CSI) reporting based on the modified wideband CQI and/or the recomputed plurality of sub-band CQIs.

20. The one or more non-transitory computer-readable media of claim 19, further comprising instructions to direct the communication device to determine a negative skewness when a greater proportion of the plurality of sub-band CQIs is lower than the wideband CQI and lower the wideband CQI when the negative skewness is determined.

* * * * *